MAGNETIC RECORDING

Filed Jan. 6, 1955

INVENTOR.
ROBERT SERRELL
BY Morris Rabkin
ATTORNEY 2,921,989
Patented Jan. 19, 1960

2,921,989

MAGNETIC RECORDING

Robert Serrell, Princeton, N.J., assignor to Radio Corporation of America, a corporation of Delaware Application January 6, 1955, Serial No. 480,191
14 Claims. (Cl. 179—100.2)

This invention relates to magnetic recording, and more particularly to an improved means for detecting magnetic signals on a magnetic record-bearing member.

It is an object of the present invention to provide means for reading signal information on a magnetic tape at a rate consistent with television frequencies.

It is another object of this invention to provide means for reading information stored on a magnetizable surface, without the necessity of requiring relative motion between the signal bearing member and a signal translating apparatus.

It is a further object of this invention to provide an improved magnetic record translating apparatus by means of which successive lines of information may be scanned transversely to the tape without requiring transverse mechanical motion of the reading head with respect to the record member.

In accomplishing these and other objects, there has been provided, in accordance with the present invention, a magnetic record transducer which comprises a plurality of laminations of suitable magnetizable material. Each lamination is provided with a signal reading gap and a partial back gap. A magnetostrictive rod member is placed in the partial back gap of the several laminations. Excitation at one end of the magnetostrictive rod produces a strain pulse which travels down the rod at a predetermined rate. The strain pulse is accompanied by a corresponding change of the permeability of the mangetostrictive member. Thus the traveling strain pulse scans each successive lamination producing a change in permeability therein. The change in permeability in the magnetic circuit of the individual laminations results in a signal being produced in a signal coil associated with the laminations only if a magnetic signal appears at the signal reading gap when the strain pulse passes the particular lamination.

A better understanding of this invention may be had from the following detailed description when read in connection with the accompanying drawing in which.

Figure 1:
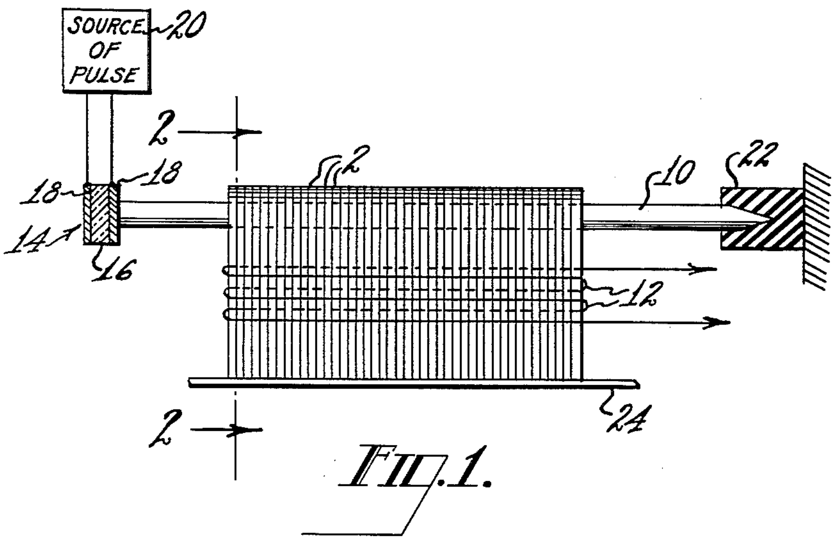
Fig. 1 is an elevational view of a magnetic record transducer embodying the present invention.

Referring now to the drawing in more detail, there is shown a magnetic record transducer in which the magnetic core of the transducer includes a plurality of laminations 2 arranged in side-by-side relation to engage adjacent longitudinal tracks on a record-bearing member. These laminations 2 are formed from a suitable magnetic material such, for example, as mumetal or suitable ferrite. They are, of course, insulated from each other to prevent the flow of eddy currents. The laminations 2 are formed to have a pair of legs 4 which define a signal reading gap 6. Opposite the signal reading gap 6, there is provided a back gap 8 having a portion of the magnetic material removed. A bar or rod 10 of magnetostrictive material which may, for example, be nickel or nickel steel alloy is positioned in the back gap of all of the laminations. The single rod 10 is common to all of the laminations 2. A signal coil 12 is wound about one or both legs 4 of the transducer core laminations. The signal coil 12 embraces all of the laminations 2. An electromechanical exciting device 14 is positioned to engage one end of the magnetostrictive rod 10 which extends beyond the stack of laminations. This exciting device may, for example, be a piezoelectrical crystal 16 which is provided with suitable electrodes 18. The electrodes 18 are connected to a source of exciting pulses 20. A pulse applied from the source 20 causes a corresponding mechanical motion of the piezoelectric crystal 16 which in turn produces a mechanical strain on the end of the magnetostrictive rod 10. When this mechanical strain in the magnetostrictive rod 10 is the result of a pulse of brief duration a narrow pulse of strain is transmitted down the length of the magnetostrictive rod 10. The opposite end of the magnetostrictive rod 10 is terminated by an acoustic pad 22 which matches the mechanical characteristic impedance of the rod so that the strain pulses are absorbed in the acoustic pad 22 and are not reflected back upon the rod. The strain pulses in the magnetostrictive rod are accompanied by a localized change in the permeability of the material of the magnetostrictive rod. This change in permeability is confined to the immediate area of the strain. Thus as the strain pulse traverses the length of the rod, a corresponding pulse of varied permeability also traverses the length of the rod. The transducer thus assembled is brought into contact with the surface of a magnetic record-bearing member 24. The record-bearing member has recorded thereon certain information which may, for example, be video information, recorded in transverse lines across the width thereof. As the tape is advanced past the lamination elements 2 of the transducer, the magnetic record signals will appear across the signal reading gaps 6 of the individual laminations. The individual laminations are activated to transduce the signals appearing across their reading gaps by the passage of the strain pulse and its accompanying change in permeability through the back gap. Any deterioration or progressive attenuation of the strain pulse as it traverses the rod may be compensated for by a corresponding decrease in the dimension of the back gap. Thus the magnetic signals will have substantially equal effect upon all of the laminations. Further, although it may be that the strain pulse grows slightly but progressively broader, the time length of the effect of the pulse on each lamination can be held constant by making the laminations progressively and slightly thinner.

Figures 2, 3, 4:
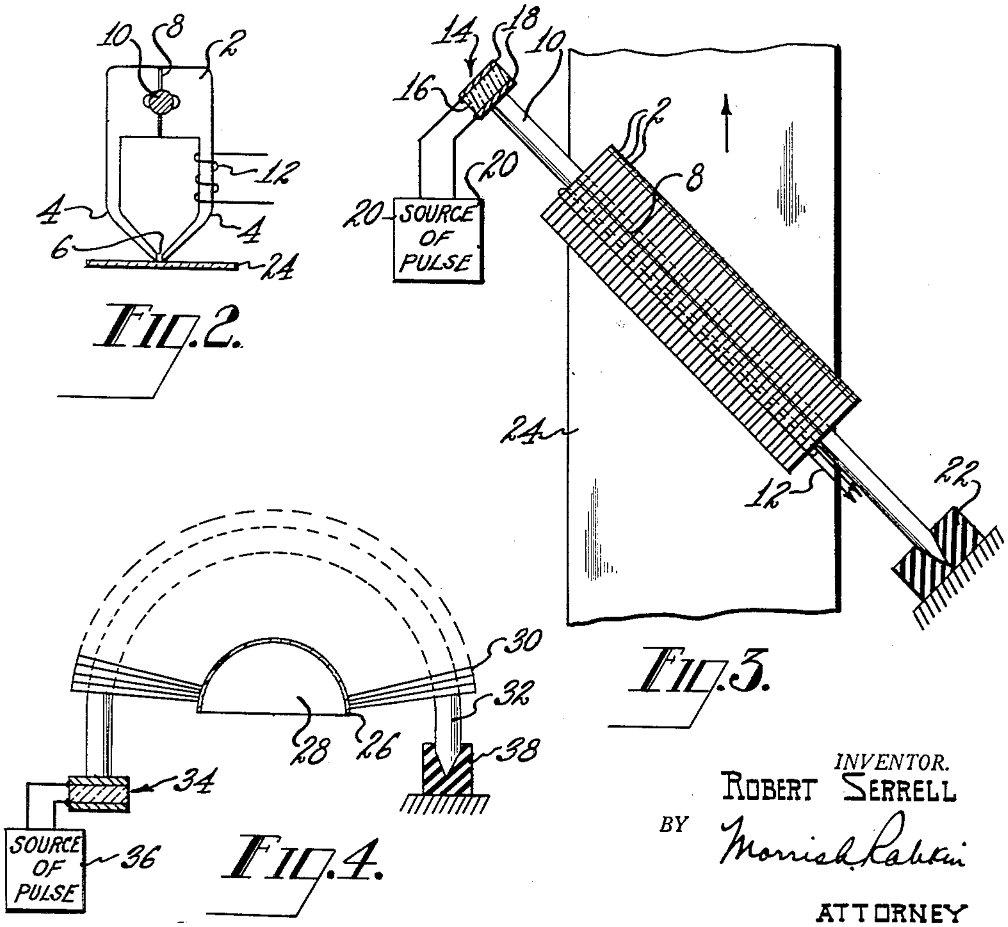
Fig. 2 is a view taken along the line 2—2 of Fig. 1 and viewed in the direction of the appended arrows.
Fig. 3 is a top view of the apparatus shown in Figs. 1 and 2.
Fig. 4 is an elevational view showing a somewhat different structure which also embodies the present invention.

If, for example, the magnetostrictive rod is made of nickel, it will be noted that the propagation of the strain pulse through the rod is approximately 5,000 meters per second. If the effective length of the rod is approximately 12½", the pulse will scan this length in approximately $\frac{1}{15750}$ of a second. This corresponds to the time duration of a television scanning line. With such an arrangement, pulses could be applied to the end of the magnetostrictive rod at the rate of 15,750 per second. This corresponds to the horizontal scanning rate currently used in television. With such an arrangement, the laminations may be made of a thickness such that a satisfactory definition would be provided. A satisfactory definition would be provided by approximately 500 such laminations. In order to reduce the width of the tape necessary to carry such signals in cooperation with a transducer of the type described, the transducer may be oriented at an angle with respect to the longitudinal dimensions of the tape. This would provide means whereby a considerably narrower tape record member could be used, greatly simplifying the tape transport mechanism necessary to handle the tape. Another arrangement which permits the use of a narrower tape is shown in Fig. 4. In that arrangement the record-bearing member 26 passes over a semicircular mandrel or guide 28. This causes the record-bearing member to occupy a semicircular path. The transducer again includes a plurality of laminations 30 separated by suitable magnetic insulation. However, in this arrangement, the laminations 30 are positioned about the semicircular surface of the mandrel 28. The signal gaps are positioned to engage the surface of the record-bearing member 26 as it passes over the mandrel. The laminations extend radially outward from the surface of the mandrel. The magnetostrictive rod or bar 32 occupies a position in the back gap of the laminations 28, as before, however, it is now bent to substantially a horseshoe configuration. Being spaced from the surface of the tape by an amount determined by the dimensions of the lamination; the curved path of the rod is considerably longer than the length of the surface of the record-bearing member engaged by the signal reading gap and of the laminations. As in the case of the previously described structure, the rod 32 is excited by an exciting member 34 which is energized from a source of exciting pulses 36. Also, the rod 32 is terminated in its characteristic mechanical impedance by an acoustic pad 38.

It will also be noted that even though the tape may be stationary with respect to the transducer, the changing permeability in the back gap of the several laminations resulting from the passage of the strain pulse along the magnetostrictive rod will result in a detection of any magnetic signal which appears across the reading gap, the change in permeability in the back gap will have no effect upon the transducer circuit. However, if a signal appears across the reading gap, the change in permeability in the back gap produces a corresponding change in the magnetic flux flowing through the transducer lamination. This change in flux results in a signal being induced into the signal coil windings.

It may now be seen that there has been provided an improved magnetic record transducer of a type suitable for handling magnetic record information at a rate consistent with television frequencies and which may be used to detect signals on a magnetic record member even though there is no relative motion between the magnetic record member and the transducer.

What is claimed is:

1. A magnetic record transducer having a magnetic core including a plurality of laminations, each of said laminations having a signal gap and a back gap, said laminations being arranged in side-by-side relation to engage adjacent longitudinal tracks on a record-bearing member, and means extending through said back gaps for sequentially varying the magnetic permeability through said back gaps of each of said laminations.

2. A magnetic record transducer having a magnetic core including a plurality of laminations, each of said laminations having a signal gap and a back gap, said laminations being arranged in side-by-side relation to engage adjacent longitudinal tracks on a record-bearing member, and means for sequentially varying the magnetic permeability through said back gaps of said laminations, said means including a magnetostrictive rod placed in the back gaps of and common to all of said laminations.

3. A magnetic record transducer having a magnetic core including a plurality of laminations, each of said laminations having a signal gap and a back gap, said laminations being arranged in side-by-side relation to engage adjacent longitudinal tracks on a record-bearing member, and means for sequentially varying the magnetic permeability through said back gaps of said laminations, said means including a magnetostrictive rod placed in the back gaps of and common to all of said laminations, and means for introducing a mechanical strain pulse into one end of said rod.

4. The invention as set forth in claim 3 wherein said means for introducing said strain pulse includes a piezoelectric crystal and a source of exciting pulses for exciting said crystal.

5. The invention as set forth in claim 4 wherein the end of said rod opposite from said one end of said rod is terminated in its characteristic mechanical impedance whereby to prevent said strain pulses from being reflected back onto said rod.

6. A magnetic record transducer having a magnetic core including a plurality of laminations, each of said laminations having a signal gap and a back gap, said laminations being arranged in side-by-side relation to engage adjacent longitudinal tracks on a record medium, and progressively operative means for varying the magnetic permeability through said back gap of each of said laminations.

7. A magnetic transducer having a magnetic core including a plurality of laminations, each of said laminations having a signal gap and means defining a magnetic flux path, said laminations being arranged in side-by-side relation to engage adjacent longitudinal tracks on a record medium, and progressively operative means for varying the magnetic permeability of the flux path in each of said laminations.

8. A magnetic transducer for cooperation with a magnetic tape record medium for reproducing signals recorded thereon on tracks disposed transverse the direction of motion of said tape, said transducer comprising a core of magnetic material of looped configuration having a lateral dimension equal to at least the length of said tracks extending across said tape in the direction of said tracks, said core of magnetic material defining a path for magnetic flux around said loop, said core having a signal gap extending laterally thereof in the side of said core confronting said tape, a signal coil around said core linking with said flux path for deriving signals corresponding to flux variations along said path, and means extending laterally through said core and disposed in said flux path capable of presenting a value of permeability different from a normal value of permeability in an incremental area along the length thereof when physically excited, and means for exciting said last-named means for causing said incremental area to travel laterally of said core along said length of said first-named means whereby to progressively vary the permeability in different incremental regions in said core laterally thereof in said flux path.

9. A magnetic head for cooperation with a magnetic tape record having signals recorded across the width thereof comprising a core of magnetic material extending across the width of said tape, said core having a signal gap therein confronting said tape and extending across the width thereof, said core defining a flux path around said core through said signal gap, an elongated element for presenting a value of magnetic permeability in an incremental area thereof differing from a normal value of permeability which travels along the length of said element when said element is mechanically excited, said element being disposed in said core intersecting said flux path and spaced from and parallel to said gap, and means for repetitively exciting said element for causing said incremental area to recurrently travel along said core in a direction parallel to said gap.

10. A magnetic head for cooperation with a magnetic tape record capable of presenting a convex record surface comprising, a core of magnetic material, said core having a concave surface for engaging said convex surface of said magnetic tape record, said core having a signal gap in said concave surface disposed across said tape, a curved rod of magnetostrictive material extending through said core parallel to said gap, means for exciting said rod with force impulses, and a signal coil around said core for deriving output signals corresponding to the magnetic flux variations therein.

11. A magnetic transducer comprising a core defining a magnetic circuit, an element included in said core for progressively varying the permeability in said circuit along incremental areas thereof, said element being disposed in said magnetic circuit for locally influencing said magnetic circuit in adjacent incremental portions thereof, and means for exciting said element to render said element effective to progressively vary said permeability.

12. A magnetic transducer for cooperation with a magnetic record having a record track recorded thereon comprising a core structure of magnetic material defining a path for magnetic flux recorded on said track, said core structure being disposed along at least a portion of said track for scanning said track portion to derive the signal recorded on said track, said core structure including an element presenting a variational permeability characteristic, said element being disposed in said flux path, and means for locally influencing said element along adjacent incremental areas thereof to progressively vary the permeability along the length thereof for scanning said track.

13. A magnetic transducer for cooperation with a magnetic record having a record track recorded thereon comprising a core structure of magnetic material defining a path for magnetic flux recorded on said track, said core structure being disposed along at least a portion of said track for scanning said track to derive said recorded flux therefrom, said core structure including an element disposed in said flux path for presenting a value of permeability along an incremental area thereof different from the permeability along the length thereof when excited, and means for exciting said element for causing said incremental area to travel along said element for progressively varying the permeability along the length thereof thereby scanning said track.

14. A magnetic record transducer having a magnetic core including a plurality of laminations, each of said laminations having a signal gap and a back gap, said laminations being arranged in side-by-side relation to engage at said signal gaps a record-bearing member, means for sequentially varying the magnetic permeability through said back gaps of said laminations, said means including a magnetostrictive rod placed in the back gaps of and common to all of said laminations, means for introducing a mechanical strain pulse into one end of said rod and for terminating the other end of said rod in its characteristic mechanical impedance to prevent said strain pulses from being reflected back upon said rod.

References Cited in the file of this patent

UNITED STATES PATENTS

| | | |
|---|---|---|
| 2,423,339 | Newman | July 1, 1947 |
| 2,641,656 | Dicke | June 9, 1953 |
| 2,681,387 | Roys | June 15, 1954 |
| 2,704,789 | Kornei | Mar. 22, 1955 |
| 2,756,276 | Gratian et al. | July 24, 1956 |
| 2,806,904 | Atkinson et al. | Sept. 17, 1957 |